(12) United States Patent
Maeda et al.

(10) Patent No.: US 6,375,269 B1
(45) Date of Patent: *Apr. 23, 2002

(54) SEAT HAVING SEATING FACE MADE OF SHEET RESILIENT MATERIAL

(75) Inventors: Minoru Maeda; Tomomi Shoji; Tsutomu Matsuzaki, all of Tochigi; Naohiro Takahashi, Saitama; Masashi Ishii, Saitama; Tsutomu Ao, Saitama, all of (JP)

(73) Assignees: TS Tech Co., Ltd.; Honda Giken Kogyo Kabushiki Kaisha, both of (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/554,867

(22) PCT Filed: Nov. 25, 1998

(86) PCT No.: PCT/JP98/05307

§ 371 Date: May 19, 2000

§ 102(e) Date: May 19, 2000

(87) PCT Pub. No.: WO99/26519

PCT Pub. Date: Jun. 3, 1999

(30) Foreign Application Priority Data

Nov. 25, 1997 (JP) .............................................. 9-339340
Dec. 26, 1997 (JP) .............................................. 9-368222
Mar. 19, 1998 (JP) ............................................ 10-090917

(51) Int. Cl.[7] .............................................. A47C 31/02

(52) U.S. Cl. ............................. 297/452.56; 297/452.59; 297/218.2; 297/218.3

(58) Field of Search ........................ 297/452.56, 218.2, 297/218.3

(56) References Cited

U.S. PATENT DOCUMENTS

| 2,371,954 A | * | 3/1945 | Cunningham ................ 267/111 |
| 2,608,243 A | * | 8/1952 | Kostrowski ............... 297/218.3 |
| 2,878,860 A | * | 3/1959 | Brattrud ................. 297/452.56 |
| 3,628,830 A | * | 12/1971 | Mitijans ................ 297/452.59 |
| 4,583,783 A | * | 4/1986 | Kanai ..................... 297/452.56 |

(List continued on next page.)

FOREIGN PATENT DOCUMENTS

| JP | 55168437 | 12/1980 |
| JP | 61107340 | 7/1986 |

(List continued on next page.)

Primary Examiner—Peter R. Brown
Assistant Examiner—Joseph Edell
(74) Attorney, Agent, or Firm—Dann, Dorfman, Herrell and Skillman, P.C.

(57) ABSTRACT

A seat having a seating face made of sheet resilient material is assembled from a seat frame comprising a substantially quadrilateral frame body, the sheet resilient material forming the seating face, a pad member forming a largely rising bank, and a skin material enclosing the pad member, wherein the sheet resilient material is stretched within a frame body of the seat frame, one end of the skin material is abutted against and fixed on the frame body of the seat frame, the pad member is assembled outside the seat frame, the skin material covers outside of the pad member from the one end which is abutted against and fixed on the frame body of the seat frame, and the other end is wound and stopped around a back of the seat frame, a bank which rises larger than the surface position of the seating face made of the sheet resilient material which is stretched within the frame of the seat frame is formed, and the bank is assembled as a strong bank with a simple structure, and the pad member prevents the seat frame from touching a sitting passenger so that the sitting passenger should not feel a sense of incongruity.

9 Claims, 8 Drawing Sheets

U.S. PATENT DOCUMENTS

| | | | |
|---|---|---|---|
| 4,685,738 A * | 8/1987 | Tlnus ................... | 297/452.56 |
| 4,883,320 A * | 11/1989 | Izumida et al. ......... | 297/452.56 |
| 5,013,089 A | 5/1991 | Abu-Isa et al. | |
| 5,236,247 A * | 8/1993 | Hewko ................... | 297/452.1 |
| 5,457,968 A * | 10/1995 | McClintock et al. ......... | 66/202 |
| 5,533,789 A | 7/1996 | McLarty, III et al. | |
| 6,070,942 A * | 6/2000 | Barton et al. .......... | 297/452.41 |
| 6,152,534 A * | 11/2000 | Maeda et al. .......... | 297/452.56 |

FOREIGN PATENT DOCUMENTS

| | | | |
|---|---|---|---|
| JP | 63209611 | | 8/1988 |
| JP | 464246 | | 6/1992 |
| JP | 583062 | | 11/1993 |
| JP | 593400 | | 12/1993 |
| JP | 8507935 | | 8/1996 |
| JP | 410276854 A | * | 10/1998 |

* cited by examiner

US 6,375,269 B1

SEAT HAVING SEATING FACE MADE OF SHEET RESILIENT MATERIAL

BACKGROUND OF THE INVENTION

The present invention relates to an improvement of a seat including a seat frame comprising a substantially quadrilateral frame body, in which a seating face is made of sheet resilient material by stretching a net-like sheet resilient body within the frame of the seat frame.

A seat forming a seating face by stretching net-like sheet resilient material within a frame of a seat frame has already been proposed (U.S. Pat. Nos. 5,013,089, 5,533,789 and Japanese Patent Application Laid-open No. H8-507935).

Since the seating face of the seat is formed of the sheet resilient material, it is possible to change the design of the seat from a normal seat, and not only the cushion properties but also breathability can be applied to the seating face, and furthermore, a pad member, a spring member and the like which constitute the seating face can be omitted, the weight can be lightened, the assembled seat has excellent space efficiency due to the thin thickness of the sheet resilient material.

When the sheet resilient material is stretched within the frame of the seat frame of the sheet resilient material, in the case of the previously proposed seat, a resin plate is mounted to an end of the sheet resilient material and is fitted in a recess formed on an axial of the seat frame, thereby fixing the end of the sheet resilient material, or the end of the sheet resilient material is directly wound around the axis of the seat frame and fixed together with a push plate by screw.

However, bank can not be provided almost at all in the seat and thus, holding properties of a sitting passenger is inferior. Further, a hard resin plate or the push plate is located around the frame, such hard resin plate or the push plate contacts the sitting passenger and thus he or she may feel a sense of incongruity, which is not preferable.

It is an object of the present invention to provide a seat having a seating face made of sheet resilient material capable of exhibiting excellent sitting properties in which a strong bank which largely rises from the seating surface made of the sheet resilient material is assembled with a simple structure, and holding properties of the sitting passenger can be improved.

SUMMARY OF THE INVENTION

A seat having a seating face made of sheet resilient material of the present invention is assembled from a seat frame comprising a substantially quadrilateral frame body, the sheet resilient material forming the seating face, a pad member forming a largely rising bank, and a skin material enclosing the pad member, wherein the sheet resilient material is stretched within the frame body of the seat frame, one end of the skin material is abutted against and fixed on the frame body of the seat frame, the pad member is assembled outside the seat frame, the skin material covers outside of the pad member from the one end which is abutted against and fixed on the frame body of the seat frame, and the other end is wound and stopped around a back of the seat frame.

According to this seat having the seating face made of sheet resilient material, the bank which rises larger than the seating surface of the seating face made of the sheet resilient material which is stretched within the frame body of the seat frame is formed and thus, it is possible to enhance the holding properties of the sitting passenger. Further, the pad member which is assembled outside the seat frame is covered with the skin material having the one side which is abutted against and fixed to the frame body of the seat frame and the other end wound around and stopped at the back of the seat frame and therefore, the bank which rises larger than the seating surface of the seating face made of the sheet resilient material can be assembled strongly with a simple structure. Further, the pad member covers the seat frame including the end of the sheet resilient material stopped at the seat frame and the one end of the skin material which is abutted against and fixed on the frame body of the seat frame and thus, the pad member prevents the seat frame from touching a sitting passenger so that the sitting passenger should not feel a sense of incongruity.

The present invention includes various features which will be apparent from the following detailed description.

DESCRIPTION OF THE PREFERRED EMBODIMENTS

The present invention will be explained in detail with reference to the accompanying drawings.

Figure 4:
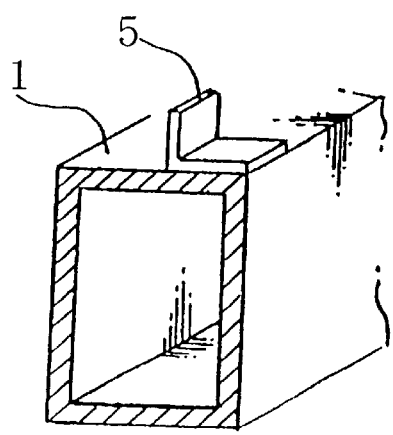
FIG. 4 is a sectional view showing another seat frame used for constituting the seat shown in FIG. 1.
Figure 5:
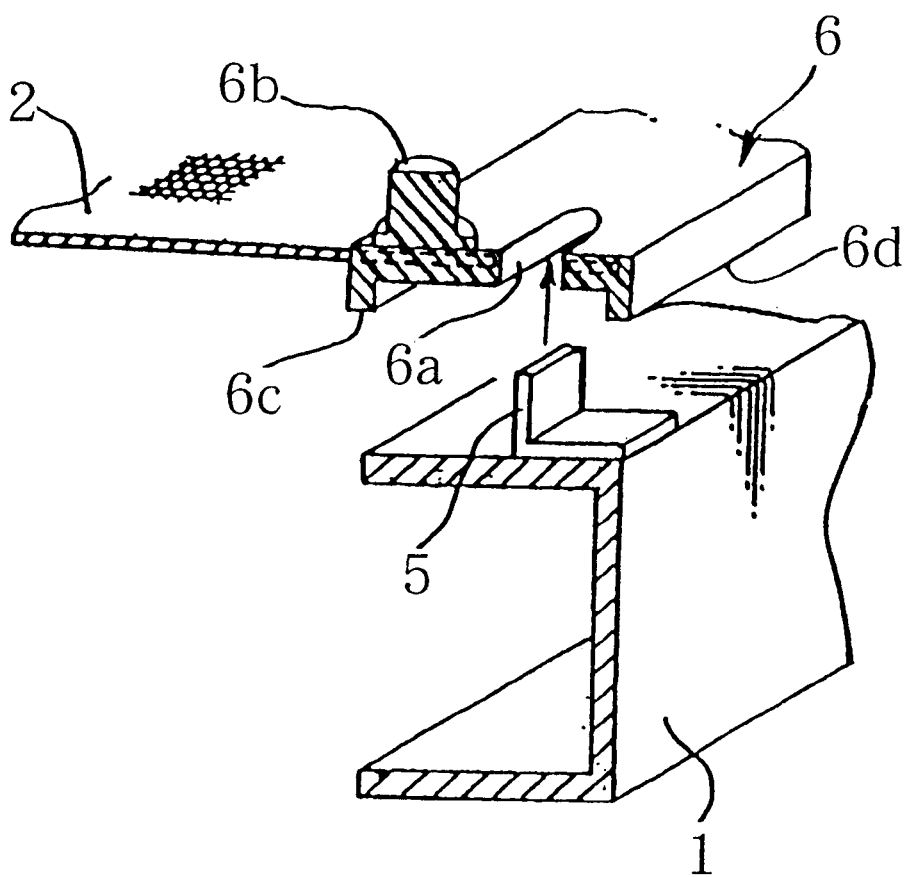
FIG. 5 is an explanatory view showing another resin plate used for constituting the seat shown in FIG. 1.
Figure 6:
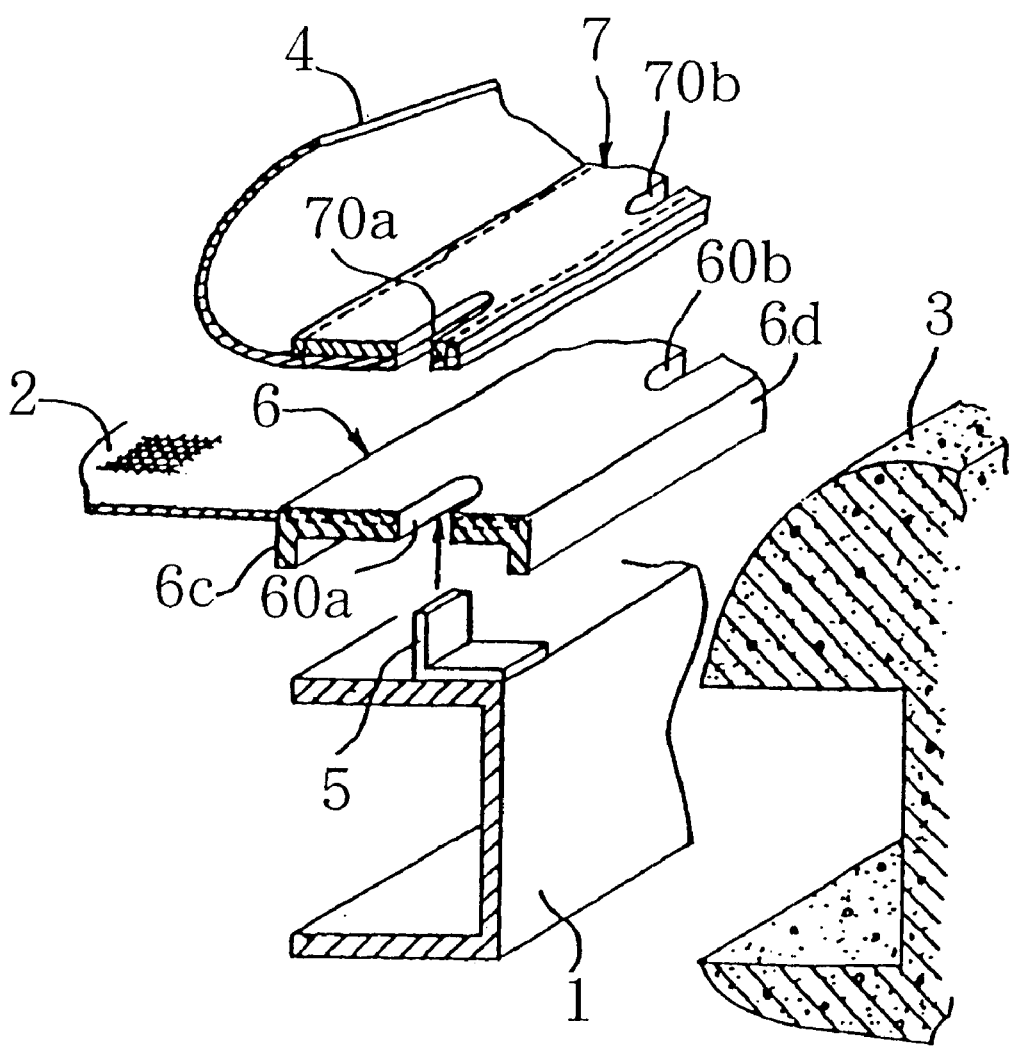
FIG. 6 is a sectional view showing the developed various parts constituting a seat according to a second embodiment of the present invention.
Figure 7:
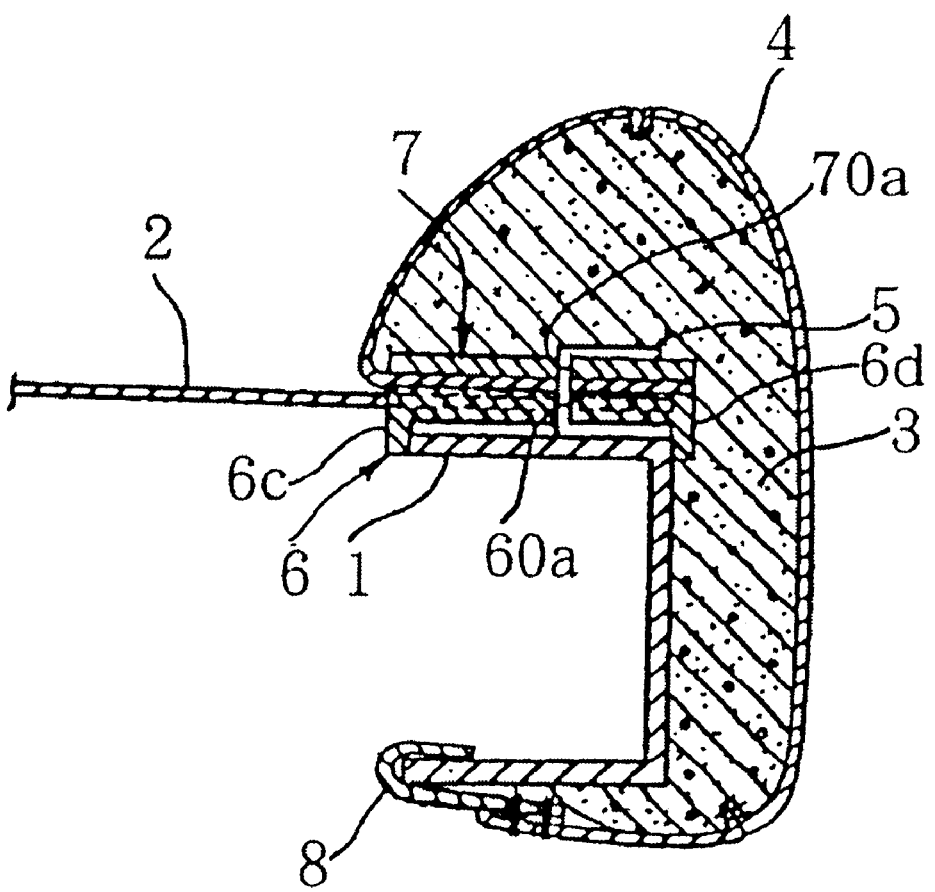
FIG. 7 is a sectional view showing the assembled state of the various parts shown in FIG.6.
Figure 8:
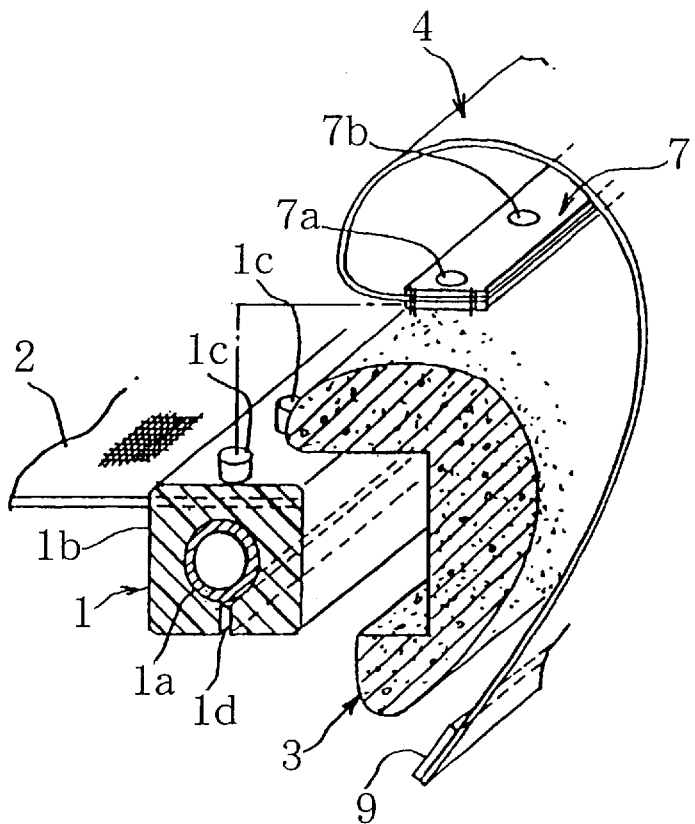
FIG. 8 is a sectional view showing the developed various parts constituting a seat according to a third embodiment of the present invention.
Figure 9:
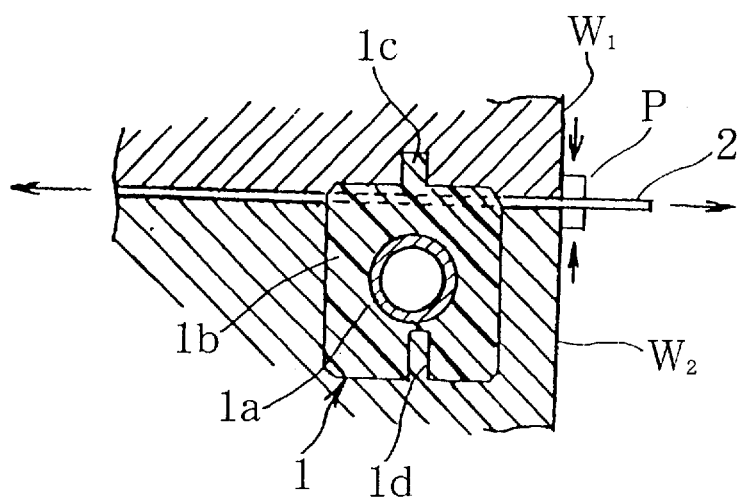
FIG. 9 is an explanatory view showing forming procedure of resin of the seat frame constituting the seat shown in FIG. 9.
Figure 10:
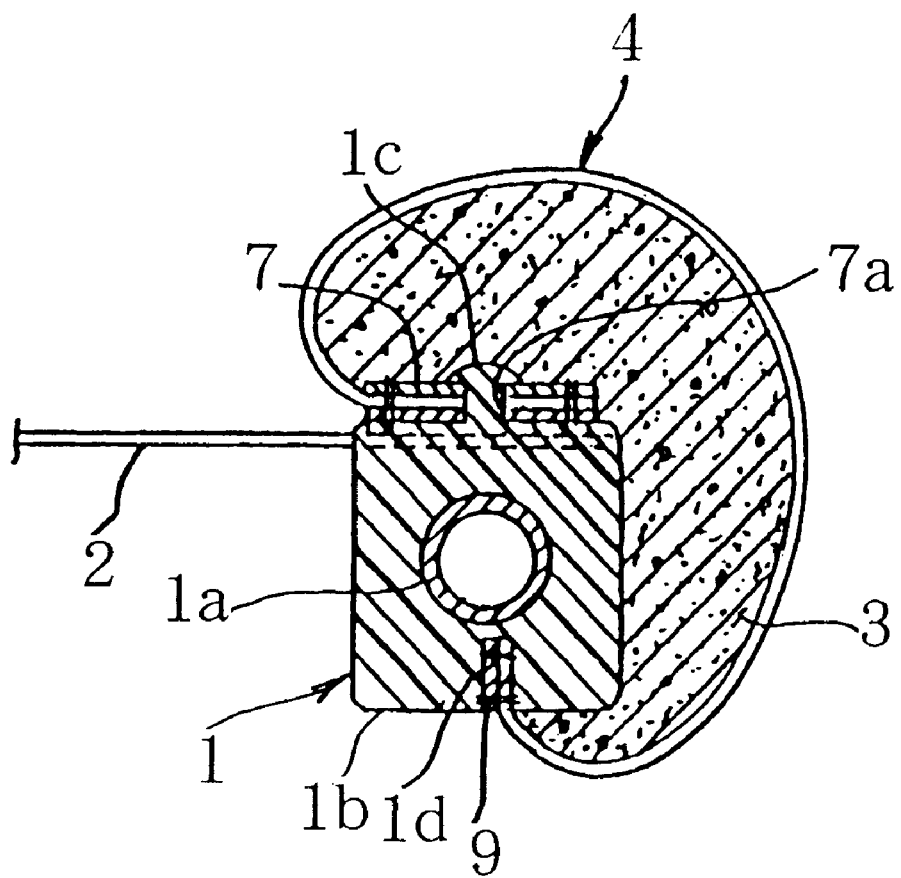
FIG. 10 is a sectional view showing the assembled state of the various parts shown in FIG. 8.

As illustrated modes for carrying out the present invention, there are a first embodiment shown in FIGS. 1 to 5, a second embodiment shown in FIGS. 6 and 7, and a third embodiment shown in FIGS. 8 to 10.

Figure 1:
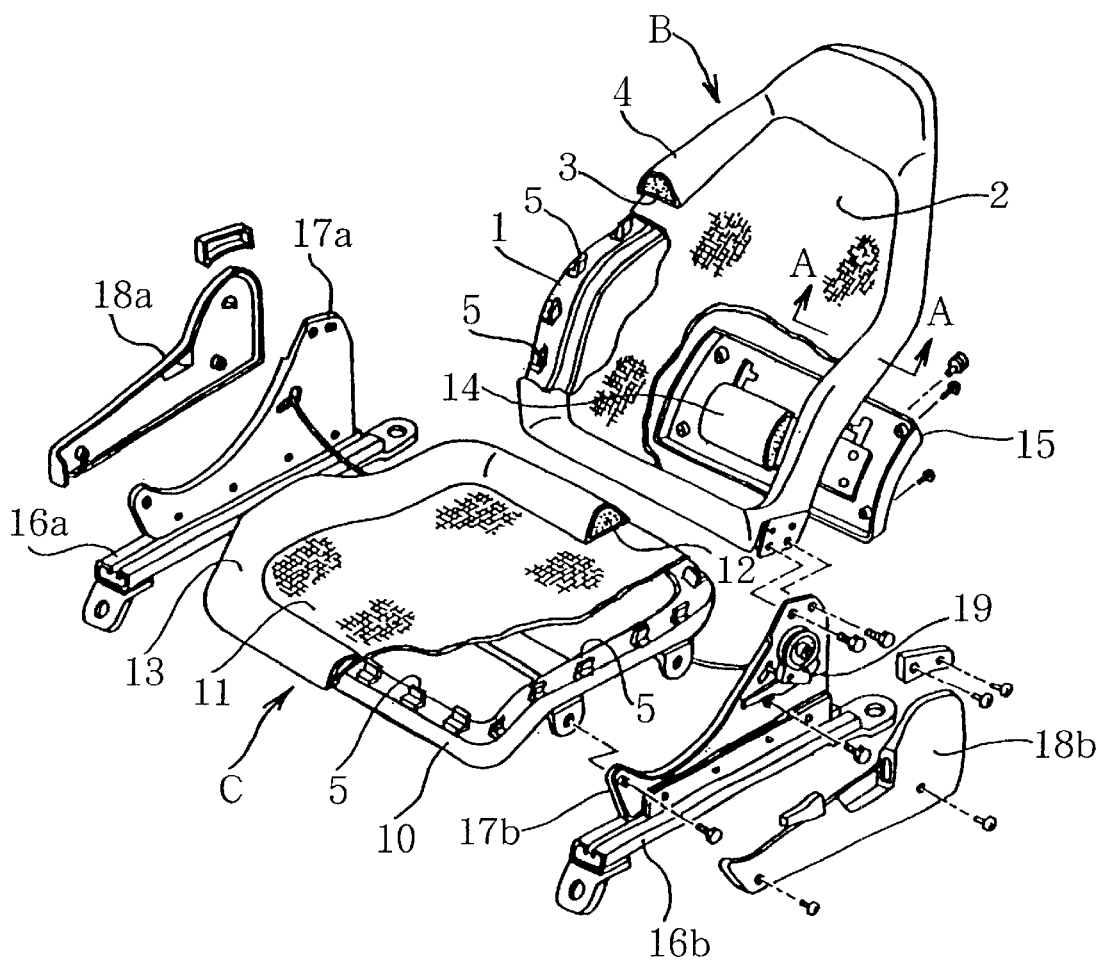
FIG. 1 is a development perspective view of the entire seat having a seating face made of sheet resilient material according to a first embodiment of the present invention.
Figure 2:
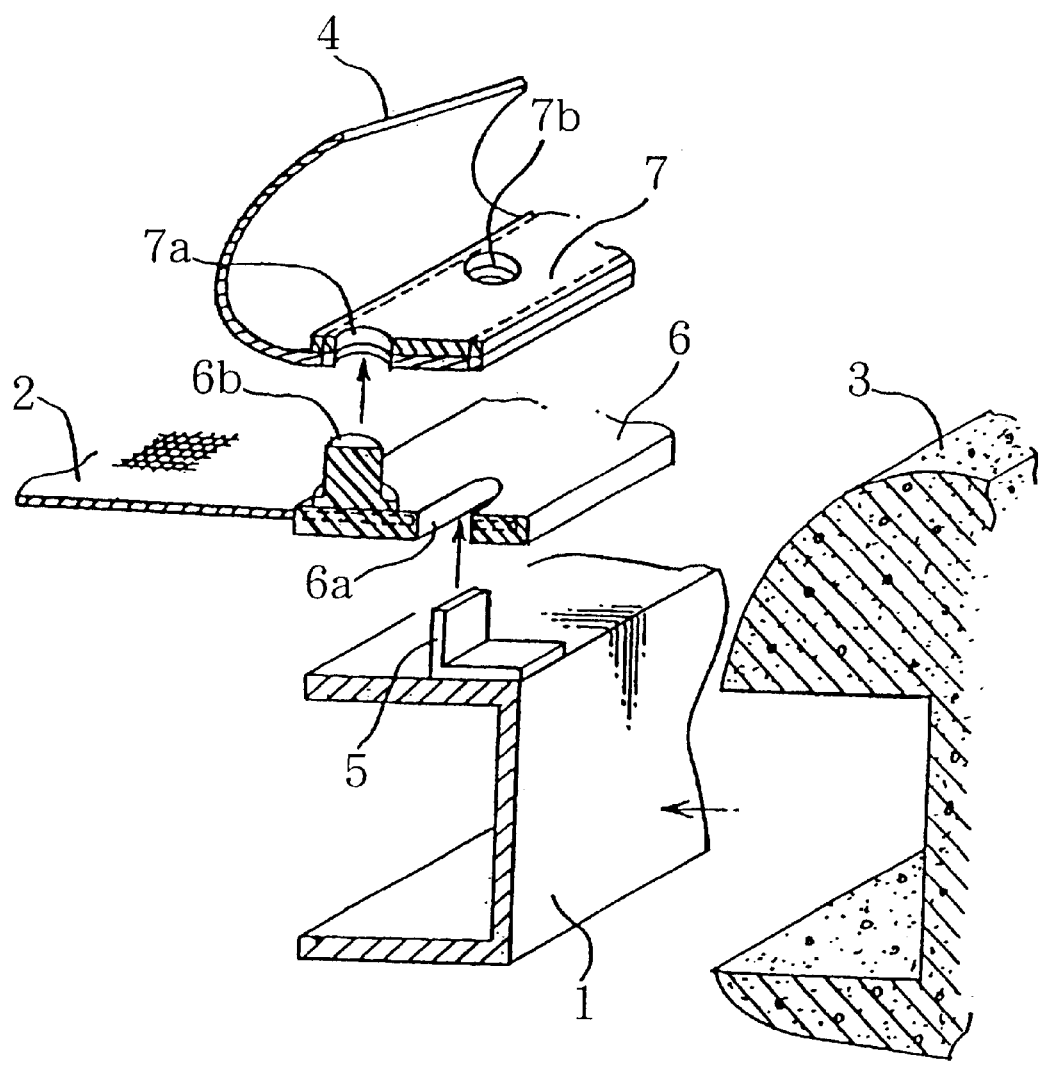
FIG. 2 is a partial sectional view showing the developed various parts constituting the seat shown in FIG. 1.

Each of the embodiments is applied to the assembling of a seat back B and a seat cushion C of a vehicle as shown in FIG. 1. Each of the seat back B and the seat cushion C of the vehicle seat is assembled from a substantially quadrilateral frame-like seat frame 1, 10, a sheet resilient material 2, 11, forming a seating face, a pad member 3, 12, forming a largely rising bank, and a skin material 4, 13, covering the pad member 3, 12.

The concrete structure will be explained based on the seat back B. In the first embodiment shown in FIG. 2, a metal frame having U-shaped cross section whose inner side is opened is used as the seat back frame 1. The seat back frame 1 is bent in the axial direction such that each of sides forming the substantially quadrilateral shape of the seat back frame 1 fits to a contour of a sitting passenger.

The seat back frame 1 is provided with a plurality of locking pawls 5 used for stretching the sheet resilient material 2 within the frame as will be described later. The locking pawls 5 are so-called "retainers", and are mounted at a distance from one another by welding on a frame surface closer to an outer peripheral edge on the side on which the sheet resilient material 2 is stretched.

A cloth having breathability is used as the sheet resilient material 2. For example, a cloth formed of a plurality of elastomer monofilaments woven by a plurality of strands such as fiber yarn used for interior cloth, a cloth or a knit to which elasticity and breathability are applied by weaving or knitting 1000 to 4000-denier elastomer monofilament to the warp or the weft can be used as the sheet resilient material 2.

The sheet resilient material 2 is integrally formed around a periphery of the resilient material 2 with a resin plate 6 made of PET, PP or the like. The resin plate 6 inserts the edge of the sheet resilient material 2 into a thick portion so that they are integrally formed by injection forming, thereby stretching the sheet resilient material 2 from its periphery.

The resin plate 6 is formed at its plate surface with a plurality of slits 6a positioned in correspondence with the locking pawls 5 of the seat back frame 1, and a plurality of boss-like projections 6b each having pedestal and rises from the plate surface at a distance from one another.

The pad member 3 is a cushion foam body such as forming urethane, and is provided with a recess in which a front surface, side surface and a back surface of the seat back frame 1 are fitted and fixed from out side, and is formed into a predetermined cubic shape. The pad member 3 may be individually formed for each side of the seat back frame 1, or the entire pad member 3 may be continuously and integrally formed in the frame shape of the seat back frame 1. The front side of the pad member 3 largely rises such as to assemble the bank having excellent holding property and especially, a portion thereof from its intermediate portion to the lower portion of both the sides largely rises, and the upper portion largely rises as a head rest portion.

As the skin material 4, any material such as real leather, a synthetic leather or fabric can be used. The entire skin material 4 may be sewn and formed into a continuous integral material such that the skin material can cover the pad member 3 assembled to each side of the seat back frame 1 and having a substantially C-shaped cross section whose inner side is opened.

A reinforcing cord 7, that is, a so-called "trim cord" is sewn to the skin material 4 along an end wound and stopped at the front surface side of the seat back frame 1. The reinforcing cord 7 is provided with a plurality of vent holes 7a, 7b located in correspondence with the projections 6b of the supporting plate 6 at a distance from one another in the longitudinal direction.

Figure 3:
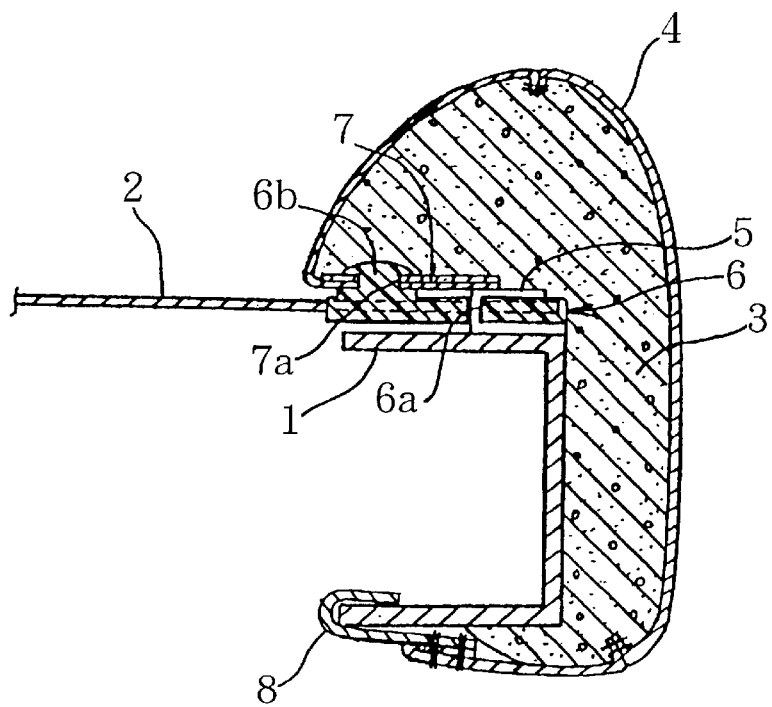
FIG. 3 is a sectional view taken along the line A—A in FIG. 1.

When assembling the seat back B from the above-described various members, as shown in FIG. 3, the locking pawls 5 of the seat back frame 1 are inserted into the slits 6a, projecting ends of the locking pawls 5 are bent outward of the seat back frame 1, the resin plate 6 is abutted against and fixed to the front surface side of the seat back frame 1, thereby stretching the sheet resilient material 2 within the frame body of the seat back frame 1. Next, the projections 6b of the resin plate 6 are fitted into the vent holes 7a, 7b of the reinforcing cord 7, the projecting end side of the projections 6b are subjected to heat caulking or supersonic wave caulking, the reinforcing cord 7 is sandwiched between the pedestals of the projections 6b and the caulked and deformed head portion so that one end of the skin material 4 is stopped and fixed at the front surface side of the seat back frame 1.

After the resin plate 6 of the sheet resilient material 2 and the one end of the skin material 4 are mounted to the seat back frame 1, the pad member 3 is assembled to each of the sides of the seat back frame 1 from outside such as to cover the one end of the skin material 4 and the seat back frame 1. Further, the skin material 4 is wound to the back surface side of the seat back frame 1 from the one end which is stopped and fixed to the seat back frame 1 so as to enclose the pad member 3. This skin material 4 can be stopped at the end by sewing a hook 8 made of hard resin along the end at the side of winding side, and by hanging the hook 8 on the flange of the seat back frame 1.

In the seat back structured as described above, since the seating face is made of the sheet resilient material 2 using the seat back frame 1 as a base and the pad member 3 is formed with the largely rising bank, it is possible to hold the sitting passenger stably. The peripheral edge of the sheet resilient material 2 is embedded in the thick portion, the resin plate 6 for stretching and holding the sheet resilient material 2 from the periphery is abutted against and fixed to the seat back frame 1 by the locking pawls 5, the one end of the skin material 4 is abutted against and fixed to the seat back frame 1 by the projections 6b and thus, it is possible to assemble the seat strongly with a simple structure. Further, the pad member 3 assembled to the seat back frame 1 covers the seat back frame 1 of course, and covers the one end of the skin member 4 including the resin plate 6 holding the end of the sheet resilient material 2. Therefore, a sense of incongruity due to the resin plate 6 and the seat back frame 1 should not be applied to the sitting passenger.

As the seat frame 1, a square pipe member as shown in FIG. 4 can be used instead of the above described frame having U-shaped cross section. In such a case, the skin material may be formed at its back surface with a back (not shown) which can open and close by a slide fastener or the like.

Further, the resin plate 6 may be provided at its opposite sides with rising flanges 6c, 6d as shown in FIG. 5. Since the rising flanges 6c, 6d fitted to the opposite sides of the seat frame 1, it is possible to accurately position the resin plate 6 and easily assemble the resin plate 6 to the seat frame 1.

In the above-described embodiment, the resin plate 6 for stretching and holding the sheet resilient material 2 from the periphery is abutted against and fixed to the seat back frame 1 by the locking pawls 5, and the one end of the skin material 4 is abutted against and fixed to the seat back frame 1 by the projections 6b. As a second embodiment, as shown in FIG. 6, the skin material 4 can be abutted against and fixed to the seat back frame 1 by engaging the reinforcing cord 7 with the locking pawls 5 together with the resin plate 6.

The resin plate 6 is provided with a plurality of slits 60a, 60b as elongated holes in positions corresponding to the locking pawls 5 of the seat back frame 1 in the longitudinal direction. The reinforcing cord 7 is provided with a plurality of slits 70a, 70b in positions corresponding to the slits 60a, 60b of the resin plate 6 in the longitudinal direction.

When the seat back B is assembled from each of the members, the rising flanges 6c, 6d of the resin plate 6 are engaged with the opposite sides of the seat back frame 1, and the resin plate 6 of the sheet resilient material 2 is abutted against the frame surface of the seat back frame 1 and is disposed. At that time, the locking pawls 5 are fitted in the slits 60a, 60b of the resin plate 6.

Next, the reinforcing cord 7 of the skin material 4 is superposed on the resin plate 6 of the sheet resilient material 2, the tip ends of the locking pawls 5 projecting from the slits 60a, 60b of the resin plate 6 are fitted in the aligned slits 70a, 70b of the reinforcing cord 7, the projecting end are bent outward of the seat back frame 1, and the resin plate 6 and the reinforcing cord 7 are fastened fixed together at the side of the front surface of the seat back frame.

With the above operation, as shown in FIG. 7, the sheet resilient material 2 can be stretched and held within the frame of the seat back frame 1 by the resin plate 6 such as to form the seating face. Further, since the seating face is made of the sheet resilient material 2 using the seat back frame 1 as a base and the pad member 3 is enclosed by the skin material 4 which fixes the one end at the front surface side of the seat back frame 1, the bank which rises larger than the surface position of the seating face made of the sheet resilient material 2 can be assembled strongly with a simple structure.

In the first and second embodiments, the metal frame having the U-shaped cross section or the square pipe member is used as the seat back frame 1, and the sheet resilient material 2 is stretched and held from the periphery by the resin plate 6. In a third embodiment, as shown in FIG. 8, a metal pipe frame 1a is used as a base frame, the pipe frame 1a is embedded in the seat back frame 1, the frame body 1b in which the peripheral edge of the sheet resilient material 2 is incorporated holds the sheet resilient material 2 at a predetermined tensile strength from the periphery. The frame body 1b and the pipe frame 1a are integrally formed of resin into the seat back frame 1.

Further, instead of the structure in which the resin plate 6 is abutted against and fixed to the seat back frame 1 by the locking pawls 5 and the one end of the skin material 4 is abutted against and fixed to the seat back frame 1 by the projection 6a, or the reinforcing cord 7 is engaged with the locking pawls 5 together with the resin plate 6 and is abutted against and fixed to the seat back frame 1, it is possible to employ a structure in which the one end of the skin material 4 is abutted against and fixed to the seat back frame 1 by the projections 1c projecting from the frame body 1b.

The frame body 1b can be formed of synthetic resin such as polyethylene terephthalate, polypropylene and polyethylene by the injection forming.

When the frame body 1b is integrally formed of resin with the sheet resilient material 2, as shown in FIG. 9, the sheet resilient material 2 is sandwiched by a fastener P from the periphery, and is stretched and supported with predetermined tensile strength, the peripheral end edge of the sheet resilient material 2 is accommodated in a cavity between an upper die $W_1$ and a lower die $W_2$ together with the pipe frame 1a, and is subjected to the injection forming.

The projections 1c for stopping the one end of the skin material 4 and a receiving groove 1d in which a locking plate of the skin material 4 which will be described later are formed by the injection forming on the frame body 1b along the axial direction of the pipe frame 1a. After the injection forming, the sandwiched portion of the sheet resilient material 2 by the fastener P may be cut and removed as reminder portion by heat cutting along the side edge of the frame body 1 since the sandwiched portion becomes frayed.

The frame body 1b is integrally formed of resin with the pipe frame 1a. The frame body 1b is formed of resin for taking in the peripheral end edge of the sheet resilient material 2 to stretch and support the sheet resilient material 2 with the predetermined tensile force from periphery. Therefore, it is possible to stretch the sheet resilient material 2 within the frame of the seat back frame 1 while keeping moderate and constant tensile strength evenly.

In the case of this seat back frame 1, as in the first embodiment, the reinforcing cord 7 provided with the plurality of vent holes 7a, 7b located in correspondence with the projections 1c of the frame body 1b may be sewed on the skin material 4 along the one end which is wound and stopped around the front surface side of the seat back frame 1, and a hanging plate 9 made of resin may be mounted along the other end.

To assemble the seat back B from each of the members, the resin plate 7 of the skin material 4 is abutted against the front surface side of the frame body 1b, the projections 1c are fitted in the vent holes 7a, 7b, the projecting ends of the projections 1c are caulked by supersonic wave welding, thermal welding or crush caulking, thereby stopping the one end of the skin material. Next, the pad member 3 is incorporated to the seat back frame 1 and enclosed by the skin material 4 such that the pad member 3 comes inside of the skin material 4, and the hanging plate 9 provided at the other end of the skin material 4 is fitted in the receiving groove 1d of the resin frame 1b and fixed.

With the above operation, as in the first and second embodiments, using the seat back frame 1 as a base, the seating face can be formed of the sheet resilient material 2 which is stretched within the frame of the seat back frame 1 while keeping the constant tensile force, and it is possible to assemble, with a simple structure, the strong seat back B having the bank which rises larger than the surface position of the seating face made of the sheet resilient material 2 from the skin material 4 enclosing the pad member 3.

As shown in FIG. 1, this seat back is provided with a lumber support 14 whose position can vertically be adjusted by a back cover 15, the back cover 15 is mounted to a lower portion of back surface of the seat back frame 1 so that the seat back can be constituted as a seat back having a back cover and keeping the breathability by the upper portion.

The above-described embodiment has been described based o n the seat back B, but it can similarly be applied for constituting the seat cushion C.

In the seat having the seating sur face made of the sheet resilient material, the seat cushion C is mounted to bracket plates 17a, 17b slidably and uprightly supported by slide rails 16a, 16b, the bracket plates 17a, 17b are covered with exterior covers 18a, 18b, whereby the seat can be constituted in the same manner as a normal seat which can be adjusted in position in the longitudinal direction. Further, if the one bracket plate 17b is provided with a reclining mechanism 19, the seat can be constituted as a reclining seat.

POSSIBILITY OF INDUSTRIAL UTILIZATION

As described above, according to the seat having the seating face made of the sheet resilient material of the present invention, it is possible to form the bank which rises larger than the seating face made of the sheet resilient material which is stretched within the frame body of the seat frame by the pad member which is assembled to the seat frame and covered with the skin material, it is also possible to enhance the holding properties of the passenger, one end of the skin material is abutted against and fixed to the frame body of the seat frame, and the pad member assembled outside the seat frame is covered with the skin material which is wound around a back of the seat frame and fixed at the other end thereof to the back of the seat frame. Therefore, it is possible to assemble the strong bank which rises larger than the seating face made of the sheet resilient material with a simple structure and further, by covering the seat frame with the pad member, the sitting passenger should not feel a sense of incongruity and thus, the present invention is suitable for constituting the seat for an automobile.

What is claimed is:

1. A seat having a seating face made of sheet resilient material, assembled from a seat frame comprising a substantially quadrilateral frame body, said sheet resilient material forming said seating face, a pad member forming a largely rising bank, and a skin material enclosing said pad member, wherein said sheet resilient material is stretched within said frame body of said seat frame, one end of said skin material is abutted against and fixed on said frame body of said seat frame, said pad member is assembled outside said seat frame, said skin material covers an outside of said pad member from said one end which is abutted against and fixed on said frame body of said seat frame, and the other end is wound and stopped around a back of said seat frame.

2. A seat having a seating face made of sheet resilient material according to claim 1, further comprising a plurality of locking pawls projecting from a frame surface of said seat frame at a predetermined distance from one another, wherein said sheet resilient material comprises a resin plate around a peripheral edge of said sheet resilient material, said resin plate comprising a plate surface having a plurality of slits located in correspondence with said locking pawls on the seat frame and a plurality of projections rising from said plate surface and spaced at a predetermined distance from one another, said skin material comprising a reinforcing cord at said one end, said reinforcing cord having a plurality of holes located in correspondence with said projections of said resin plate, said resin plate is mounted to said frame body of said seat frame by said locking pawls which are inserted into said slits and bent so that said sheet resilient material is stretched within said frame body of said seat frame, and said reinforcing cord is mounted to said resin plate by said projections which are fitted into said holes and caulked, whereby said one end of said skin material is connected and fixed to said frame body of said seat frame.

3. A seat having a seating face made of sheet resilient material according to claim 1, further comprising a plurality of locking pawls projecting from a frame surface of said frame body at a predetermined distance from one another, wherein said sheet resilient material comprises a resin plate around a peripheral edge of said sheet resilient material, said resin plate comprising a plate surface having first slits located in correspondence with said locking pawls of said seat frame, said skin material comprising a reinforcing cord at said one end of said skin material, said reinforcing cord having second slits at positions aligned with said first slits of said resin plate, said resin plate of said sheet resilient material is abutted against and disposed on a frame surface of said frame body, said reinforcing cord of said skin material is superposed on said resin plate of said sheet resilient material, and said locking pawls of said seat frame are fitted in said first slits of said resin plate and said second slits of said reinforcing cord, said locking pawls are bent, whereby said resin plate and said reinforcing cord are fastened and fixed to said seat frame.

4. A seat having a seating face made of sheet resilient material according to claim 2 or 3, wherein said sheet resilient material is formed integrally with said resin plate.

5. A seat having a seating face made of sheet resilient material according to claim 2, wherein said resin plate is provided along opposite sides thereof with rising flanges which engage opposite side surfaces of said seat frame.

6. A seat having a seating face made of sheet resilient material according to claim 1, wherein said sheet resilient material is fixed to and held by said substantially quadrilateral frame body which is formed integrally with a peripheral edge of said sheet resilient material.

7. A seat having a seating face made of sheet resilient material according to claim 6, wherein a plurality of projections are provided on said frame body and disposed at a constant distance from each other, said skin material is provided at said one end of said skin material with a reinforcing cord having a plurality of holes in positions in correspondence with said projections of said frame body of said seat frame, and said reinforcing cord is mounted to said frame body by causing said projections to be fitted in said holes and caulking said projections, whereby said one end of said skin material is connected and fixed to said seat frame.

8. A seat having a seating face made of sheet resilient material according to claim 3, wherein said resin plate is provided along opposite sides thereof with rising flanges which engage opposite side surfaces of said seat frame.

9. A seat having a seating face made of sheet resilient material according to claim 4, wherein said resin plate is provided along opposite sides thereof with rising flanges which engage opposite side surfaces of said seat frame.

* * * * *